United States Patent [19]
Nissen et al.

[11] 3,747,410
[45] July 24, 1973

[54] INDIUM-SESQUIOXIDE VACUUM GAUGE
[75] Inventors: Rudolf F. Nissen, Batavia; Edward B. Tilles, Aurora, both of Ill.
[73] Assignee: The United States of America as represented by the United States Atomic Energy Commission
[22] Filed: July 5, 1972
[21] Appl. No.: 269,003

[52] U.S. Cl. .............................. 73/398 AR, 338/36
[51] Int. Cl. .............................................. G01l 9/02
[58] Field of Search .................... 73/398 AR, 398 R; 338/2, 36; 29/620

[56] References Cited
UNITED STATES PATENTS
3,527,099   9/1970   Herceg .......................... 73/398 AR Primary Examiner—Donald O. Woodiel
Attorney—Roland A. Anderson

[57] ABSTRACT

A gauge of pressure at and below atmospheric pressure is formed by applying indium in a controlled amount to an insulating surface, oxidizing the indium to indium sesquioxide, and measuring the electrical resistance between contacts at two locations on the layer of indium sesquioxide. The electrical resistance thus measured is a function of the ambient pressure to which the layer is exposed, providing a useful gauge over the range from atmospheric pressure to $10^{-7}$ Torr.

5 Claims, 4 Drawing Figures

INDIUM-SESQUIOXIDE VACUUM GAUGE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention relates to a method and means of measuring pressure in a vacuum environment ranging in pressure from atmospheric to $10^{-7}$ Torr.

Many well-known methods and means exist for the measurement of pressures below that of the atmosphere. Mechanical and manometric gauges are used in a range from atmospheric pressure to 1 Torr. These gauges include Bourdon tubes and bellows gauges, in which elastic deformation of a mechanical element is measured in response to pressure. Manometric gauges include various modifications of the U-tube in which the height of a column of liquid provides a measure of pressure.

An intermediate range of pressures, from approximately $10^{-1}$ Torr to $10^{-4}$ Torr, is measured by various means including the thermocouple gauge and the Pirani gauge. Each of these well-known gauges responds to the variation of the thermal conductivity of a gas as a function of pressure. This pressure range is also served by the McLeod gauge, which extends manometric methods to lower pressures by compressing a sample of gas at the test pressure and measuring the pressure of the compressed gas.

Pressures below $10^{-4}$ Torr are measured with ionization gauges and Philips gauges. Each of these gauges responds to ion current generated by bombardment of gas molecules. This current is proportional to gas density and thus to pressure over a useful range.

Any useful pressure gauge must produce a reliable and repeatable reading over a desired range. It must not distort the reading of its presence and it must not contaminate any system in which it is used. It must either be independent of the composition of the gas being measured or else it must be capable of repeatable calibration for various compositions.

Pressure measurement in particle accelerators presents two challenges. The first is range. It is desirable to be able to measure pressure from atmospheric to $10^{-7}$ Torr. This is presently accomplished using two or more guages, one, such as a thermocouple gauge, for pressures from atmospheric to a vacuum such as $10^{-3}$ or $10^{-4}$ Torr, and another, such as an ionization gauge, for higher vacuums. Any such apparatus must be capable of withstanding the radiation environment present in accelerators, including fluxes of gamma rays and bombardment by accelerated particles.

SUMMARY OF THE INVENTION

Pressure is measured in a range from atmospheric pressure to $10^{-7}$ Torr by measuring the resistance of a thin layer of indium sesquioxide disposed in the vacuum environment, which resistance is a function of the pressure.

It is an object of the present invention to provide an improved method and means for measuring pressure.

It is an object of the present invention to provide a method and means for measuring pressures in the range from atmospheric pressure to $10^{-7}$ Torr.

It is an object of the present invention to provide a method and means for measuring pressure reliably and repeatably.

It is an object of the present invention to provide a single apparatus for measuring pressure over the entire range from atmospheric pressure to $10^{-7}$ Torr.

It is an object of the present invention to provide an improved sensor for pressures at and below atmospheric pressure.

DETAILED DESCRIPTION OF THE PREFERRED EMBODIMENT

Figure 1:
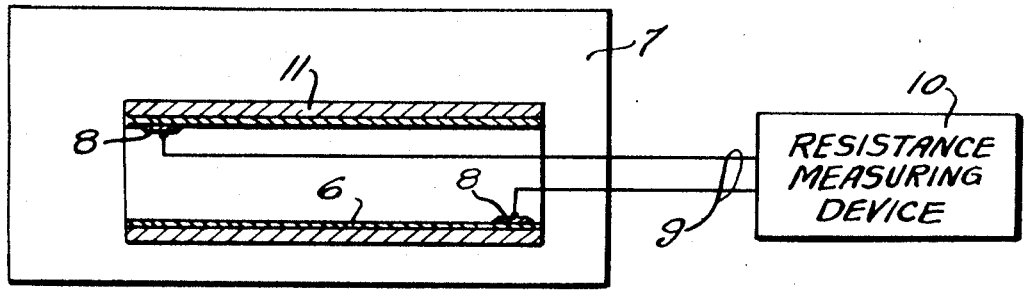
FIG. 1 is a partial sectional view of an apparatus for the practice of the present invention.

FIG. 1 illustrates a pressure gauge constructed according to the principles of the present invention. Indium sesquioxide 6 is disposed in a uniform thickness in vacuum environment 7. Electrical contacts 8 are affixed to indium sesquioxide 6 in two locations, and are also connected through electrical leads 9 to a suitable resistance measuring device 10, such as a Wheatstone bridge. Pressure in a range from atmospheric pressure to $10^{-7}$ Torr is measured by determining the resistance between electrical contacts 8, which resistance is a function of the environmental pressure.

Typical thickness ranges of indium sesquioxide 6 that are useful for measuring pressure are so thin, in the range of 10–150 microns, that some means of support is of use. Ceramic tube 11 shows a preferred structure for such support with the indium sesquioxide 6 applied as a coating on the inside of ceramic tube 11. It is necessary that a supporting structure such as ceramic tube 11 by an electrical insulator, and it is necessary that indium sesquioxide 6 be uniform in thickness. A preferred means of accomplishing these objectives in a supporting structure is by depositing indium sesquioxide 6 on the interior of the tube 11 by some such process as vapor-depositing, sputtering, or plating.

Figure 2:
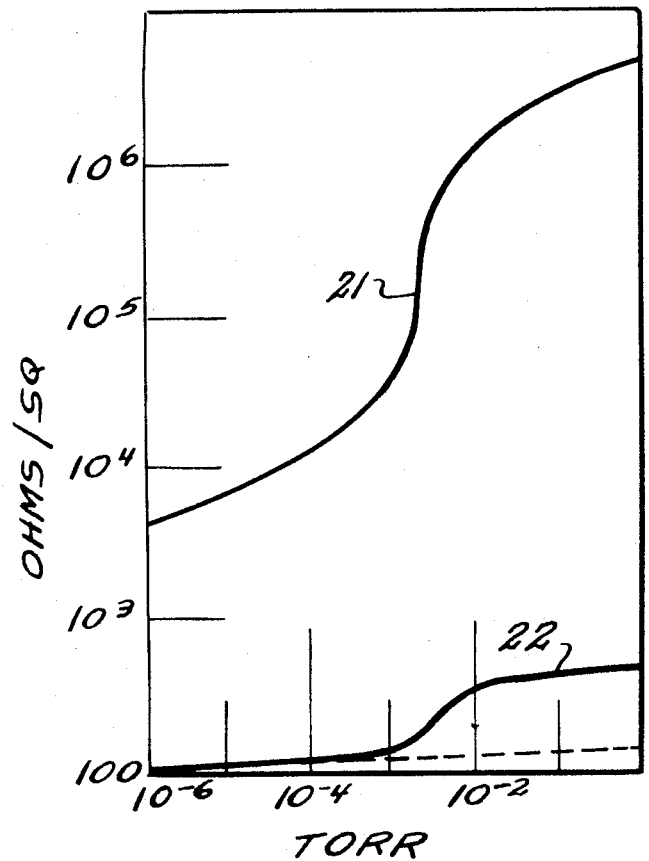
FIG. 2 is a curve showing the variation in the resistance of a unit square of indium sesquioxide as a function of the lineal density of indium.

FIG. 2 shows curves of electrical resistance across a unit square of indium sesquioxide, plotted as a function of environmental pressure. Two particular curves are shown. Upper curve 21 represents data for a layer of indium sesquioxide approximately 25 microns thick. The resistance across a unit square of indium sesquioxide for curve 21 is seen to be 35 Megohms at atmospheric pressure, and drops to 4000 ohms at $10^{-7}$ Torr. Lower curve 22 represents data for a layer of indium sesquioxide approximately 150 microns thick. In this curve, 22, the observed resistance of 3700 ohms across a unit square at atmospheric pressure drops to 100 ohms at $10^{-7}$ Torr.

Curves other than those shown in FIG. 2 can be constructed for different thicknesses of indium sesquioxide. This can be seen by referring to FIG. 3, which is a curve showing resistance at atmospheric pressure of a unit square of indium sesquioxide plotted as a function of the weight of indium deposited per inch on the interior of a cylinder of 2.75-inch internal diameter. This curve can be applied to determine the resistance of a unit square of any surface at atmospheric pressure by noting that each 10 milligrams per inch of indium applied to such a cylinder correspond to a surface density of 1.16 milligrams per square inch of indium. Thus, curve 22 in FIG. 2 has a resistance across a unit square of 3700 ohms at atmospheric pressure. This corresponds to a lineal density of approximately 17 milligrams per inch of indium deposited on the interior of a cylinder of internal diameter 2.75 inches. It thus corresponds to a surface density of $17 \times 1.16 \div 10 = 2.0$ milligrams per square inch of indium. Similar calculations can be made to achieve other desired values of resistance across a unit square at atmospheric pressure.

Figure 3:
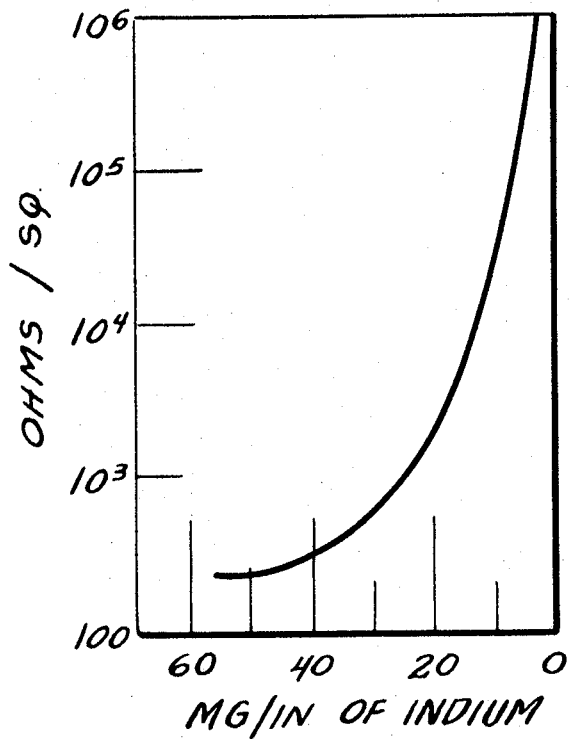
FIG. 3 is a curve showing the resistance of a unit square of indium sesquioxide plotted as a function of environmental pressure.

A routine calculation makes it possible to express the abscissa of the graph in FIG. 3 as a function of thickness of indium deposited. Each 10 milligrams per lineal inch corresponds to a thickness of 24 microns of indium. Thus, the operating range of thickness covered in FIG. 3 is approximately 10–150 micron.

It should be understood that the illustration of a cylindrical structure 11 to support indium sesquioxide 6 is not essential to the practice of this invention. A flat surface or any other shape could be used. It is, however, essential to have a uniform thickness of indium sesquioxide 6.

Figure 4:
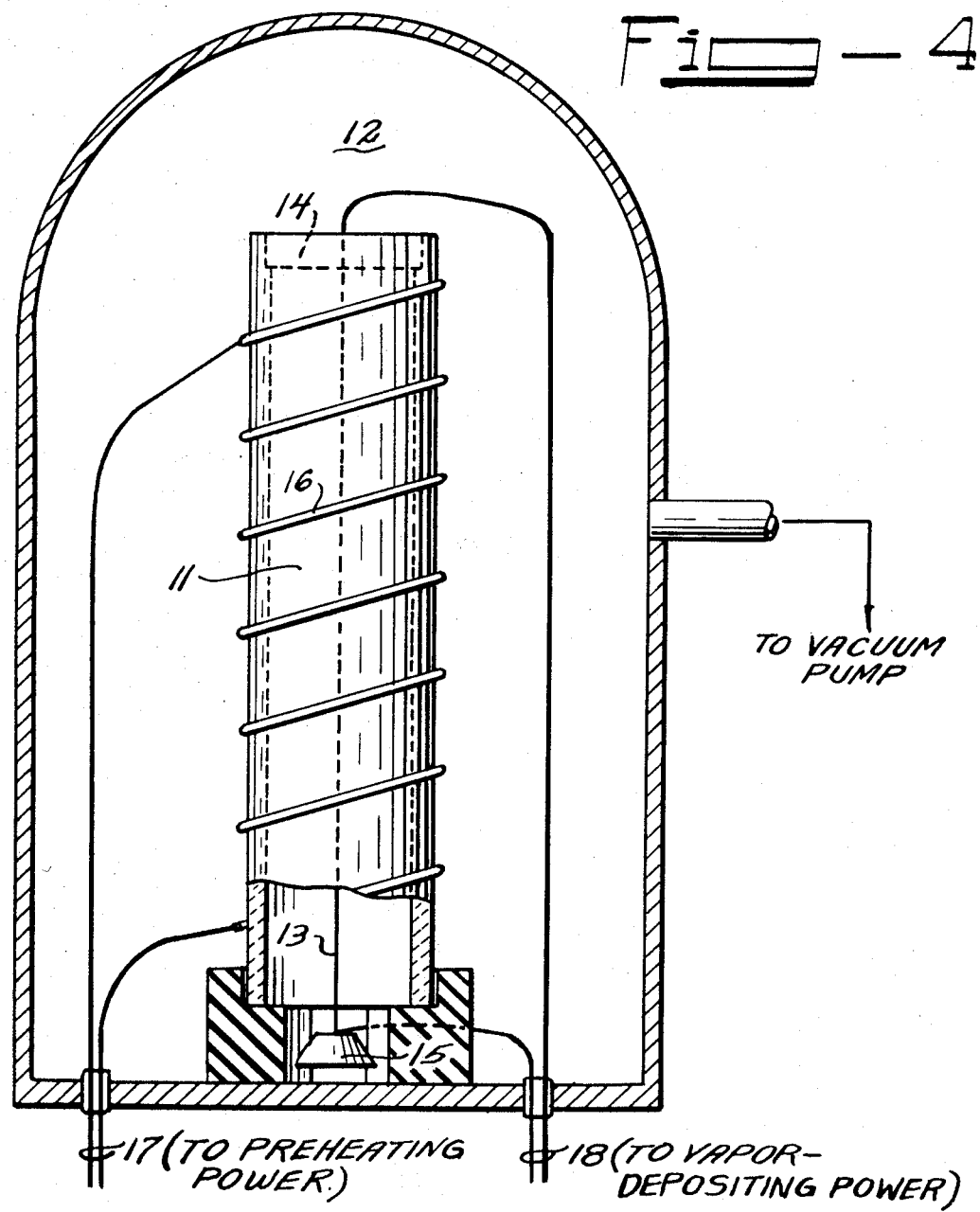
FIG. 4 is a partial sectional view of an apparatus for depositing indium on an insulator.

Turning now to FIG. 4, an apparatus is shown that was used for depositing indium on the interior of a ceramic tube 11 for the practice of the present invention. A heater wire 13 was suspended from plug 14 and was maintained in tension by a weight 15. A preheater 16 was disposed about cylindrical ceramic tube 11. A source of preheating power was connected to preheater 16 by preheater electrical lead 17 and a source of vapor-depositing power was connected to heater wire 13 by heater wire electrical leads 18. Ceramic tube 11 was made of alumina, an electrical insulator that is capable of withstanding processing temperatures to 500°C. Application of indium began with a thorough cleaning and preparation of the interior surface of ceramic tube 11. This can be done by any conventional cleaning and smoothing methods. The methods actually used were sandblasting of tubes up to 10 inches in length with 80-grit alumina. Longer tubes were dry-ball-milled with No. 4 glass balls and 80-grit alumina, using the tube as its own ball mill. The tubes were then cleaned with a chromic-acid solution, washed in tap water, then distilled water, and finally rinsed in ethanol.

Several types of material were used for heater wire 13. Best deposition was achieved with 3 strands of tungsten wire, twisted in a loose lay, each strand being 0.020 inch in diameter. Adequate deposition was achieved using 3 strands of 0.020-inch tungsten in a standard tight twist, and also using a single strand of tungsten of 0.060-inch diameter. Other heaters were made of a nickel-chromium alloy resistance wire sold under the trademark Nichrome and formed in a single strand of 0.040-inch diameter wire and also in a double strand of 2 wires each of 0.020-inch diameter. Indium metal foil was affixed to the heater wire by wetting an indium wire into adhesion with the heater wire by means of a soldering iron where precise control of the weight of indium was of minimal concern. Where precise control of the weight of indium was desired, indium was electroplated on the filament using standard techniques. A sample wire of known length and weight was electroplated along with the desired wire, and the amount of deposited indium was determined by comparative weighing of the sample before and after electroplating.

To coat the interior of tube 11, the tube was cleaned as described and the indium-coated heater wire 13 was installed as indicated in FIG. 1. The vacuum environment 12 was pumped to $10^{-6}$ Torr and maintained at this pressure for an hour to outgas the system. Preheater 16 was used to heat the ceramic tube 11 to a temperature in a range between 25°C. and 150°C., both to outgas tube 11 and to prepare tube 11 for vaporization of indium. Best results were achieved by heating tube 11 to a temperature of 93°C. Heater wire 13 was then energized electrically to vaporize the indium. The electricity was then turned off and ceramic tube 11 was transferred to a standard oven operating in a temperature range between 450°C. and 800°C. in an air atmosphere to oxidize the indium. Best results were achieved at an oven temperature of 500°C. maintained for 24 hours. An oxygen atmosphere was used in the oven in some experiments but did not appear to be necessary, as adequate oxidation was achieved using air as the oxidizing medium.

The apparatus of FIG. 4 has been used to deposit indium on the interiors of tubes of alumina. The indium was oxidized to indium sesquioxide and was used in an apparatus as shown in FIG. 1 to produce the curves of FIG. 2. Thus a gauge was produced that provided an indication or pressure over the entire range from atmospheric pressure to $10^{-7}$ Torr.

It will be understood that the invention is not to be limited by the details given herein but that it may be modified within the scope of the appended claims.

The embodiments of the invention in which an exclusive property or privilege is claimed are defined as follows:

1. A method of measuring pressure in an environment comprising the steps of:
    a. placing a thin uniform layer of indium sesquioxide in the environment; and
    b. measuring the electrical resistance of the layer of indium sesquioxide, which electrical resistance is a measure of the pressure in the environment.

2. The method of claim 1 wherein the thin layer of indium sesquioxide is formed on an electrically-insulating surface.

3. The method of claim 1 wherein the thin layer of indium sesquioxide is formed by vapor-depositing indium uniformly on an electrically-insulating surface and oxidizing the indium to indium sesquioxide.

4. The method of claim 3 wherein the indium is vapor-deposited at a uniform surface density in the range from 0.45 milligram per square inch to 7.0 milligrams per square inch.

5. An apparatus for measuring pressure of an environment comprising:
    a. an electrically-insulating surface;
    b. a uniform layer of indium sesquioxide deposited on said insulating surface and subject to said environmental pressure; and
    c. means for measuring the electrical resistance of said indium sesquioxide over a predetermined portion thereof, which resistance is a measure of said environmental pressure.

* * * * *